UNITED STATES PATENT OFFICE 2,102,051

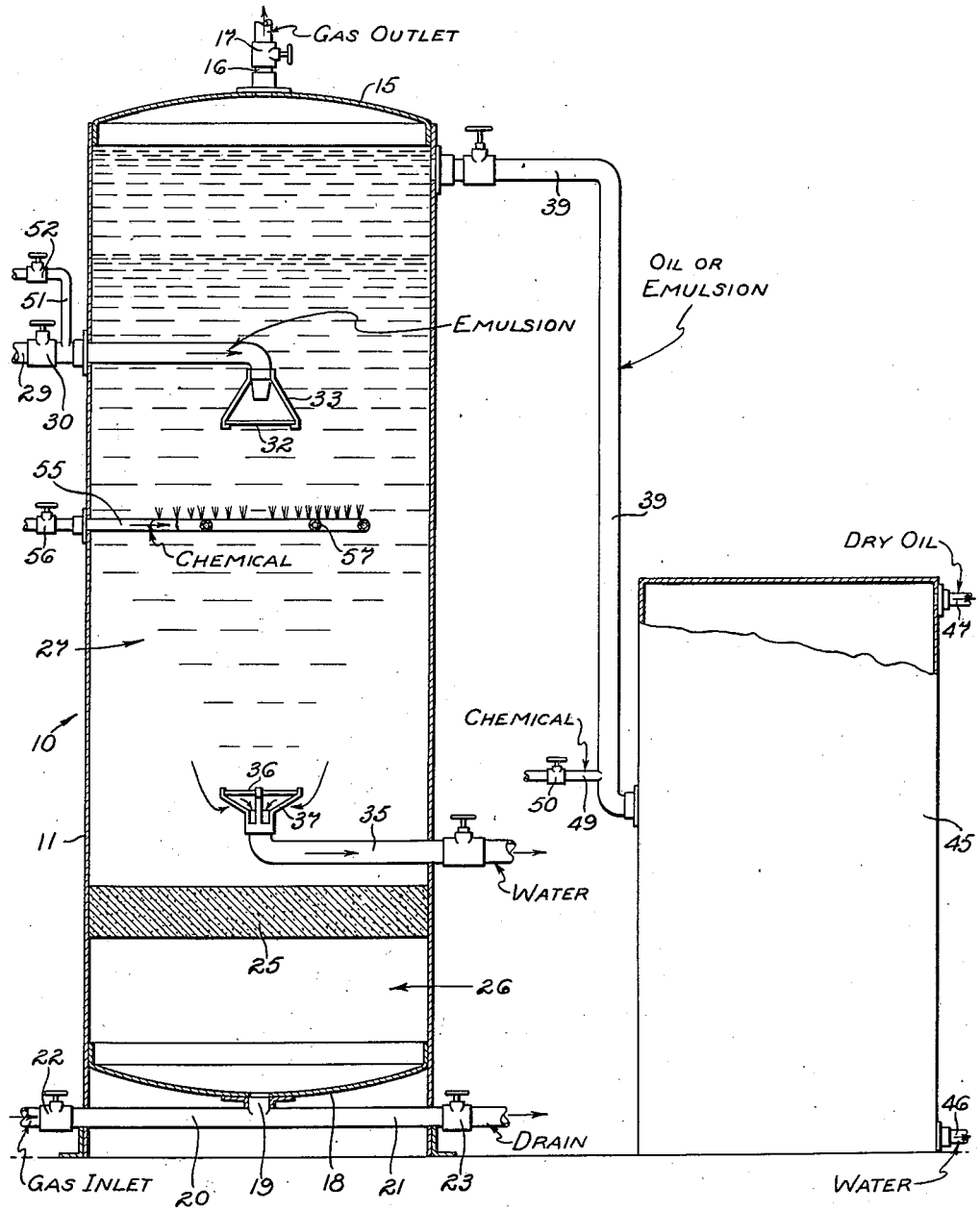

METHOD OF SEPARATING EMULSIONS OF THE OIL-IN-WATER TYPE

William Woelflin, Long Beach, Calif., assignor to Petroleum Rectifying Company of California, Los Angeles, Calif., a corporation of California Application June 16, 1936, Serial No. 85,521

6 Claims. (Cl. 196—4)

This invention relates to a method of treating emulsions of the oil-in-water type to remove the oil from the water, and is particularly applicable to treatment of ballast water withdrawn from the tanks of an oil-burning ship.

In my copending application, Serial No. 689,747, filed September 16, 1933, of which the present application is a continuation-in-part, there is set forth a process of treating such emulsions by adding a chemical de-emulsifying agent thereto and bubbling a gas upward therethrough to sweep the oil droplets from the water. The present invention is directed particularly to those emulsions of the oil-in-water type in which the water phase comprises substantially fresh water, as distinct from a brine such as sea water. For instance, ships sometimes take on ballast water while in fresh water, and it has been found extremely difficult to separate the oil from such ballast water by conventional methods, especially if the density of the oil is close to the density of the water. Based on the A. P. I. scale adopted as standard by the American Petroleum Institute, fuel oils ranging in gravity from 6.5° A. P. I. to 15° A. P. I. have not been capable of separation by methods known prior to my invention, and it is an object of the present invention to provide a novel method of treating such oil-in-water emulsions in which the water phase is fresh and in which the gravity of the oil is from 6.5° to 15° A. P. I., though the invention is also applicable to emulsions containing oil of a gravity outside of this range.

The present invention comprehends addition to such an emulsion of oil in fresh water, of a water-soluble salt of the alkaline earth group and a chemical de-emulsifying agent capable of reacting with this water-soluble salt to give a colloidal dispersion in the water of a soap formed by the reaction of these two added materials, after which gas is bubbled through the modified emulsion to sweep the oil therefrom and leave a purified water body.

It is an object of the present invention to provide such a method of treating an oil-in-water emulsion, such as a ballast water, the water-soluble salt being added either before, during or after addition of the chemical de-emulsifying agent.

Further objects and advantages of the invention will be made evident to those skilled in the art from the following description:

The drawing illustrates one type of apparatus which can be used for carrying out the process.

Referring to this drawing, I have shown a separator 10 including a shell 11 closed at its upper end by a head 15 which provides a gas outlet 16 with a suitable valve 17. The lower end of this shell 11 is closed by a head 18 and communicates with a pipe 19 connected both to a gas inlet pipe 20 and to a drain pipe 21, these pipes respectively including valves 22 and 23. The valve 23 is normally closed except when liquid is being drained from the shell.

Any suitable means is used for distributing the gas forced through the pipe 20, the embodiment shown including a porous member 25 retained in position in the lower portion of the shell by means not shown. The space in the shell below the porous member 25 thus comprises a gas chamber 26, this gas moving upward through the porous member 25 and being distributed into a separating chamber 27 defined by that portion of the shell above the porous member 25.

The oil-in-water emulsion, such as the ballast water previously described, is introduced into the separating chamber 27 through a pipe 29 provided with a valve 30. This emulsion may be introduced and distributed through pipes or any other suitable means. In the embodiment shown it is introduced in a downward direction through the pipe 29 which is bent downward. It is sometimes preferable to use a splash plate 32 against which the incoming emulsion is forced, this plate very effectively distributing the incoming emulsion. However, this plate can be dispensed with. If used, the plate may be mounted by any suitable means such as brackets 33 connected to the pipe 29.

It will thus be clear that the intermediate portion of the separating chamber 27 is filled with the emulsion, and that the gas will be distributed equally by the porous member 25 and will bubble upward through the emulsion.

Two materials are added to the emulsion either before or after it enters the separating chamber 27. The order in which these materials are added is immaterial, and in some instances they can be added together if the conditions are suitably controlled to give a good dispersion in the water.

The first of these materials to be mentioned is a water-soluble salt of the alkaline earth group. Any of the water-soluble salts of calcium, magnesium, strontium or barium may be successfully used. By way of example, salts comprising chlorides of these metals give very satisfactory results. Such water-soluble salts of the alkaline earth group of metals will dissolve in the water and will give ions corresponding to the metal used. These dissolved salts react with the other chemical, a de-emulsifying agent, in a manner to be hereinafter described. It will be clear that one or more of the salts of the alkaline earth group of metals may be used, and the definition herein of adding a salt of this group is not limited to the addition of a single salt.

The other material added to the emulsion is a chemical de-emulsifying agent capable of reacting with the added salts to form a colloidal dispersion in the water of a soap of the alkaline earth metal whose salt was added. By way of example, if this chemical de-emulsifying agent is sodium oleate in an aqueous or alcohol solution, and if the salt added is magnesium chloride, the reaction would give a colloidal dispersion of magnesium soap. This magnesium soap, or other soaps formed within the concept of this invention, will adsorb at the oil-water interface and will modify the emulsion in a manner facilitating coalescence of the oil droplets, and in a manner permitting adherence of the gas particles and the oil droplets.

This chemical de-emulsifying agent is preferably a chemical which modifies the interfacial characteristics of the emulsion, and those chemicals which change the interfacial tension seem to be very satisfactory. Water-soluble chemicals are preferred. Thus, a water-soluble de-emulsifying agent may be used, preferably one which reacts with the salt or salts added to the fresh-water phase, to form an oil-soluble soap which is colloidally dispersed in the water, this soap aiding the coagulation or separation of the finely-divided oil particles. Various examples will be given of chemical de-emulsifying agents suitable for this purpose. For instance, certain of the water-softening agents may be used, as set forth in the patent to Barnickel, No. 1,223,659, or modified fatty acids are applicable, as set forth in the Barnickel Patent, No. 1,467,831. A modified organic soap-forming material is described in the patent to DeGroote, et al., No. 1,595,457, and this material can also be used to advantage. Highly colloidal, coagulescent suspensions, containing a soap-forming organic radical may also be used, as described in the patent to DeGroote, No. 1,596,593. A reagent capable of forming, by reaction in the continuous phase, a substance in a state of colloidal dispersion therein, and which will act as an emulsifying colloid tending to reverse the form of the emulsion, can also be used. Such a material is set forth, for instance, in the patent to Ayres, Jr., No. 1,570,987. In addition, water-soluble soaps of fatty acids, as oleic acid or stearic acid, may be used, as well as any other de-emulsifying agent capable of reacting with the salt to form a soap which is suitable for the separation of water and oil emulsions.

It has been found that the gas particles moving upward through the thus-modified emulsion tend to become associated with the oil droplets therein, carrying these oil droplets upward therewith and into the upper portion of the separating chamber 27. The rising gas bubbles thus have the effect of sweeping the oil droplets from the water, thus leaving a purified and substantially oil-free water in the lower portion of the separating chamber 27 whence it can be withdrawn through a pipe 35, preferably provided with a plate 36 carried by brackets 37. The material which is carried upward by the gas is collected in the upper end of the separating chamber and may be withdrawn through a pipe 39. When certain emulsions are being treated in the manner hereinbefore described, the material thus withdrawn through the pipe 39 will be substantially a water-free oil. However, when other emulsions are being treated, it has often been found that this material will be a reverse-type emulsion, to-wit, an emulsion of the water-in-oil type. Such an emulsion is herein termed an auxiliary emulsion.

If such an auxiliary emulsion of the water-in-oil type is formed, it may be discarded, used for various purposes, or separated into its oil and water constituents. If it is desired to separate this auxiliary emulsion, this may be done by the use of various auxiliary means.

In the drawing I have illustrated such an auxiliary means as including a settling tank 45, the emulsion being introduced into the central portion thereof by any suitable means not shown. With some types of emulsion the gravitational action itself will suffice to separate the phases of this auxiliary emulsion, the water being withdrawn through a pipe 46 and the oil through a pipe 47. This action is, however, greatly accelerated by the use of a suitable chemical de-emulsifying agent which may be introduced directly into the settling tank 45 or into the pipe 39 through a pipe 49 controlled by a valve 50. This chemical may be of any suitable type capable of breaking such an auxiliary emulsion which is substantially of the water-in-oil type, and the chemical de-emulsifying agent mentioned above may be used in this capacity.

Returning to the main separating action which takes place in the separator 10, it should be noted that the two materials mentioned above can be added to the emulsion constituents in various ways. If desired, the chemical de-emulsifying agent may be first added, followed by the addition of the salt of the alkaline earth group of metals. However, the drawing illustrates the other, and often preferable, procedure, the salt of the alkaline earth group of metals being added either dry or in solution through a pipe 51 communicating with the pipe 29 and providing a control valve 52 or other suitable means for controlling the quantity of the material thus added. The chemical de-emulsifying agent may be similarly introduced into the material flowing through the pipe 29, or it may be introduced directly into the separating chamber 27 through a pipe 55, the quantity being controlled by a valve 56 or by other means. Any suitable means can be used for distributing this chemical, the drawing illustrating concentric pipes 57 in this regard, these pipes communicating with the pipe 55 and providing upward-directed openings through which the chemical is distributed. This chemical de-emulsifying agent may be added either in dry state or in solution, aqueous solutions or solutions in alcohol being quite satisfactory.

As to the quantity of the salt of the alkaline earth group of metals, this is not critical. Only small quantities are usually necessary, quantities ranging from 40 grams per barrel to 120 grams per barrel usually giving good results. However, quantities below or above this range can be used, if desired. The optimum proportion of this material will vary with different emulsions.

Similarly, the quantity of chemical de-emulsifying agent utilized can be quite small. Ratios of from one part of chemical to 1000–8000 parts of emulsion give best results, though these limits are not absolutely fixed. Usually the quantity of chemical de-emulsifying agent desirable will depend upon the quantity of the salt of the alkaline earth group of metals added. Smaller quantities of such a salt will require smaller quantities of the de-emulsifying agent to react therewith in the manner set forth above. While only the theoretical quantity of de-emulsifying agent sufficient to complete this reaction is needed, I usually find it desirable to use an excess of this de-emulsifying material in most instances, though the invention is not limited thereto.

The use of soap-forming chemical de-emulsifying agents is particularly desirable in conjunction with the rising gas particles, bubbles forming in the chamber 27, each bubble being formed by a particle of gas surrounded by a soap-like film. Careful observation shows the presence of minute oil droplets in these soap-like films. Often the surface of the liquid in the chamber 27 presents froth-like appearance, and as the bubbles break the gas is liberated and the oil droplets coalesce. Usually this separation of the gas can conveniently take place in the upper end of the chamber 27, but, if desired, it is possible to remove this foam or froth prior to the time that all of the gas is liberated, allowing the material to stand until this gas is released. Only a short interval of time is necessary for this gas to be completely released.

The gas utilized may be air or other gas, and the proportion of gas to water is not critical. From three to fifteen or more volumes of air per volume of water ordinarily give very satisfactory results, larger quantities of air being unnecessary and not proportionately increasing the effectiveness of separation. Satisfactory commercial results can usually be obtained by utilization of from three to ten volumes of gas per volume of water. However, the process is not limited to the ranges set forth above, for satisfactory treatment can be obtained even below or above these limits, depending upon the permissible oil content of the purified water. However, within such limits as set forth above, I have found it possible to easily meet governmental regulations which prohibit discharge of water into harbors if this water contains more than seventeen parts per million of oil.

The separator 10 may be either of the open or closed type, and in some instances the head 15 can be entirely dispensed with. This separator may be operated at atmospheric pressure, or at pressures above atmospheric. In the latter instance, suitable valves are provided in the outlet pipes and suitable pumps are installed in the pipes supplying gas on the ballast water or other emulsion to the separating chamber, as well as on the pipes delivering the chemical to the emulsion.

It should be understood that the process is not limited to the apparatus herein disclosed, any of the various apparatus modifications mentioned in my copending application, supra, can be used in conjunction with this process. For instance, various means can be utilized for introducing the two materials into the emulsion, and for distributing the gas or otherwise mixing this gas with the emulsion to be treated. As mentioned in my copending application, supra, various other devices may be substituted for the auxiliary means such as the settling tank 45, the only requirement being that such a means satisfactorily separates the oil and water, or in some instances the gas, from any auxiliary emulsion which may be formed in the process. By way of example, the phases of such an auxiliary emulsion can be separated by use of heat, an electric field or by subjection to centrifugal force in manners known in the art with regard to other emulsions.

While I have shown the invention in conjunction with a continuous process, it should be clear that this is not essential. A batch process may be used with entire success. Finally, while the invention finds distinct utility in separating oil from ballast water, it should be clear that I am not limited thereto, for various emulsions of the oil-in-water type can be satisfactorily separated by my process.

The terms "colloidal" and "colloidally" as herein used are to be understood as indicative of a dispersion sufficiently fine to be effective in modifying the interface of the water and oil emulsion.

I claim as my invention:

1. A process of treating ballast water and other oil-in-water emulsions in which the water phase is fresh water, which process includes the steps of: adding to said emulsion two materials capable of reacting to form soap which is colloidally dispersed in the water phase, one of said materials being a water-soluble salt of the alkaline earth group of metals and the other of said materials being a chemical de-emulsifying agent capable of reacting with the water-soluble salt to form said colloidal dispersion of soap; and bubbling a gas upward through said emulsion whereby the gas becomes associated with the oil droplets modified by said soap and sweeps these oil droplets upward to leave a body of purified water.

2. A process of treating ballast water and other oil-in-water emulsions in which the oil is dispersed as small droplets in a water phase of fresh water, which process includes the steps of: sweeping the oil droplets upward through said emulsion to form an upper body of auxiliary emulsion of the water-in-oil type and leaving a body of purified water, by modifying the emulsion by the addition of two materials and bubbling a gas upward through the modified emulsion, one of said materials being a water-soluble salt of the alkaline earth group of metals, and the other of said materials being a chemical de-emulsifying agent capable of reacting with the dissolved salt to form a soap colloidally dispersed in the water; and separately withdrawing said purified water and said auxiliary emulsion.

3. A process of treating ballast water and other oil-in-water emulsions in which the oil is dispersed as small droplets in a water phase of fresh water, which process includes the steps of: sweeping the oil droplets upward through said emulsion to form an upper body of auxiliary emulsion of the water-in-oil type and leaving a body of purified water, by modifying the emulsion by the addition of two materials and bubbling a gas upward through the modified emulsion, one of said materials being a water-soluble salt of the alkaline earth group of metals, and the other of said materials being a chemical de-emulsifying agent capable of reacting with the dissolved salt to form a soap colloidally dispersed in the water; separately withdrawing said purified water and said auxiliary emulsion; and separating the auxiliary emulsion thus withdrawn into its constituent oil and water phases.

4. A process of treating ballast water comprising a fresh water phase in which is dispersed oil droplets, said oil being of a density closely approximating the density of said fresh water, which method includes the steps of: adding to said ballast water while in its original state in which the density ratio of oil to water has not been altered a water-soluble salt of the alkaline earth group and a chemical de-emulsifying agent of the type capable of reacting with the water-soluble salt to form a soap; and bubbling a gas upward through a body of the resulting product whereby said gas becomes associated with the oil droplets as modified by said soap to leave a body of purified water.

5. A process of treating ballast water comprising a fresh water phase in which is dispersed oil droplets, said oil being of a density closely approximating the density of said fresh water, which method includes the steps of: adding to said ballast water while in its original state in which the density ratio of oil to water has not been altered a water-soluble salt of the alkaline earth group and a chemical de-emulsifying agent of the type capable of reacting with the water-soluble salt to form soap; bubbling a gas through a body of the resulting product while positioned in a chamber whereby said gas becomes associated with the oil droplets as modified by said soap to carry these modified oil droplets upward to form a body of emulsion of the water-in-oil type in the upper end of said chamber, leaving a body of purified water in the lower end of said chamber; removing water from the lower end of said chamber; and removing said emulsion of the water-in-oil type from the body thereof in the upper end of said chamber without resolution thereof while in said chamber into its constituent oil and water phases.

6. A method of treating an emulsion of the oil-in-water type and comprising a continuous phase of fresh water of a gravity of substantially 10° A. P. I. in which is dispersed oil droplets of a gravity from 6.5° A. P. I. and 15° A. P. I., which method includes the steps of: adding to said emulsion while the gravities of said oil and water are substantially as set forth above a water-soluble salt of the alkaline earth group and a chemical de-emulsifying agent capable of reacting with said water-soluble salt of the alkaline earth group to give a colloidal dispersion in the water of a soap of the water-soluble salt utilized and to change the interfacial characteristics of said modified emulsion; maintaining a body of the chemically-treated emulsion in a chamber with a body of an auxiliary emulsion of the water-in-oil type thereabove; bubbling a gas upward through said body of chemically-treated emulsion whereby said gas becomes associated with the modified oil droplets and moves the same upward to said body of auxiliary emulsion; removing purified water from the lower end of said chamber; and removing said auxiliary emulsion from the body thereof without resolution thereof in said chamber into its constituent phases of water and oil.

WILLIAM WOELFLIN.